UNITED STATES PATENT OFFICE.

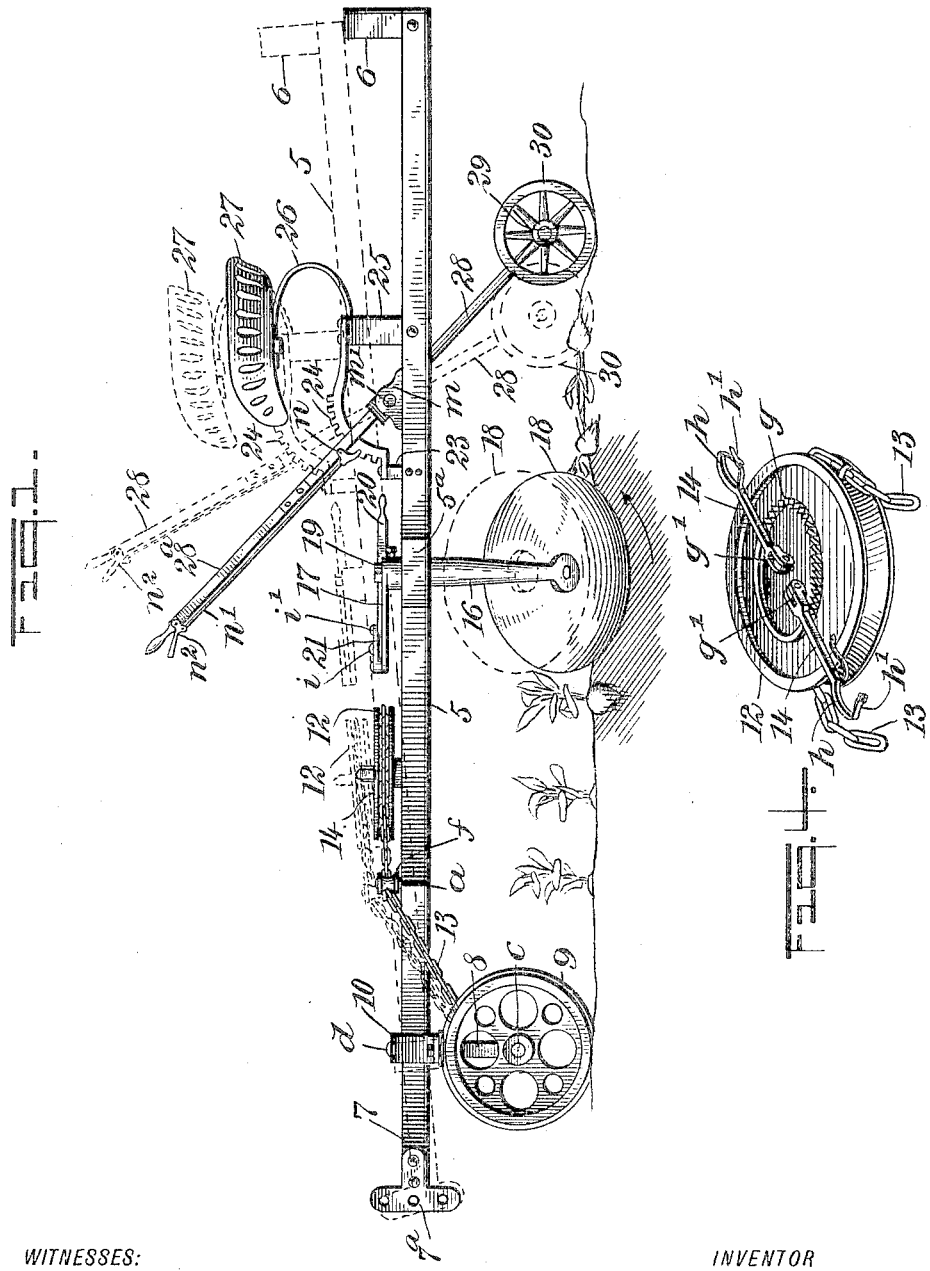

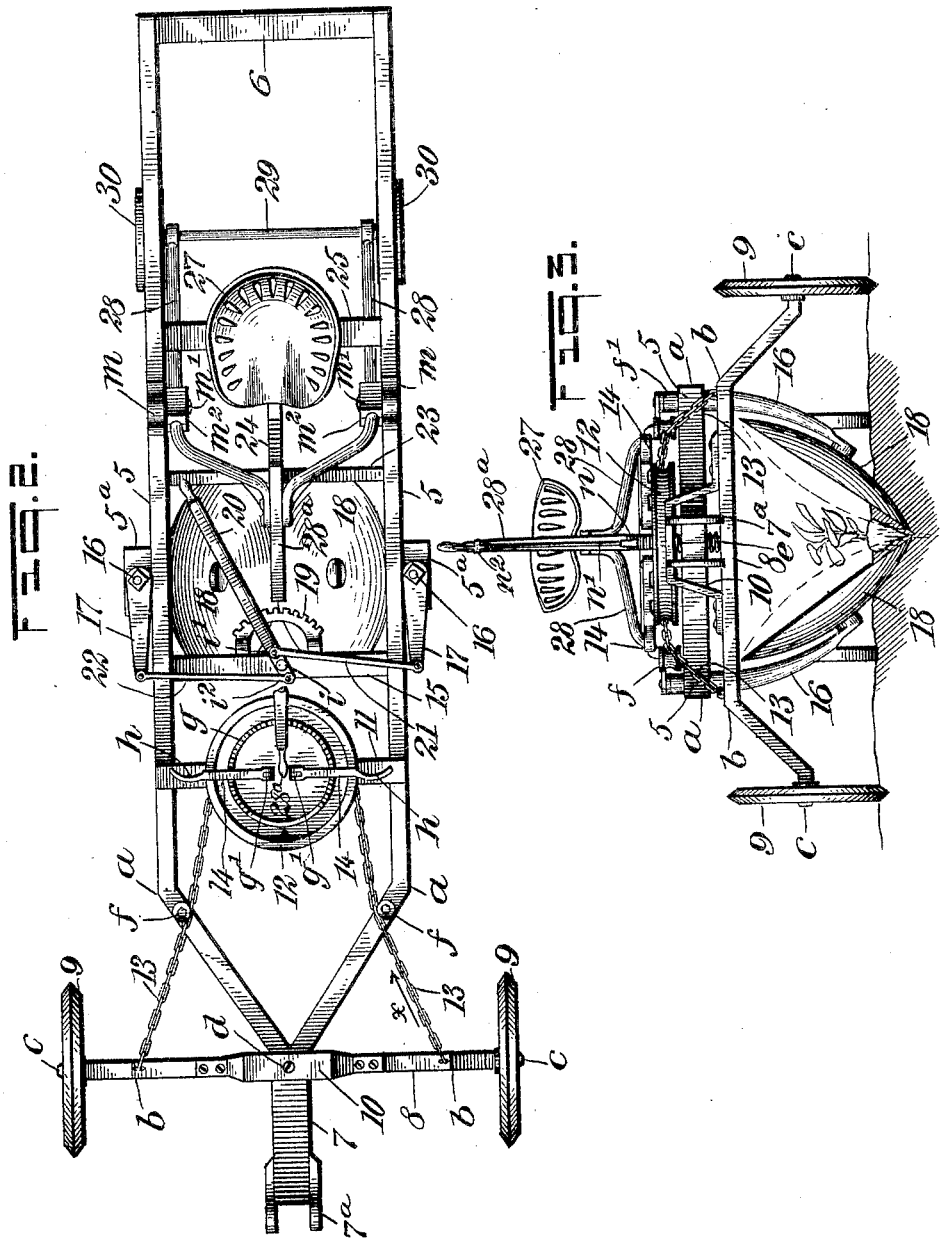

EDWARD G. SMART, OF SALINAS, CALIFORNIA.

BEET-PLOW.

No. 804,631.　　　Specification of Letters Patent.　　　Patented Nov. 14, 1905.

Application filed December 15, 1904. Serial No. 236,952.

*To all whom it may concern:*

Be it known that I, EDWARD G. SMART, a citizen of the United States, and a resident of Salinas, in the county of Monterey and State of California, have invented a new and Improved Beet-Plow, of which the following is a full, clear, and exact description.

This invention relates to means for removing beets or other esculent tubers from the soil, and has for its object to provide a power-drawn plow having adjustable disks that by rotation raise the vegetables from the ground and leave them on the surface, cutting off vines and weeds when said disks are progressively moved along rows of the beets for their excavation from the soil.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view of the improved plow, showing its operation by full lines and its inoperative adjustment by dotted lines. Fig. 2 is a plan view of the plow. Fig. 3 is a front end elevation of the same, and Fig. 4 is a perspective view of a steering-wheel that is a detail of the invention.

A frame is provided for the support of the other parts of the implement in operative positions and consists of two side beams 5 5, spaced apart in parallel planes by a rear cross-bar 6, and a draft-beam 7. The forward portions of the side beams that are bent toward each other at *a a* are affixed upon the rear end of said draft-beam, as indicated in the drawings. A forward axle 8, that is bent at *b b* to produce an intermediate horizontal raised portion thereon, terminates at the ends in spindles *c c*, whereon are mounted two similar wheels 9 9, adapted for rotation thereon. The wheels 9 are V-shaped on their peripheries to prevent their slipping sidewise on the ground. Centrally between the spindles *c* a looped yoke-frame 10 is mounted and secured upon the axle 8, this frame having legs that space the main portion thereof from the horizontal body of the axle and render it parallel therewith. The draft-beam 7 is inserted loosely between the axle 8 and the level portion of the yoke-frame 10 and is thereto pivoted by a king-bolt *d*.

Upon the spaced side beams 5 5 near the bends *a a* a flat frame-bar 11 is mounted transversely and secured by its ends to said beams, and centrally on the frame member 11 a steering-wheel 12 is mounted pivotally and supported so as to yield in a vertical plane by a spring-coil *e*, as indicated in Fig. 3. The steering-wheel 12 is circular and peripherally grooved for the engagement therein of a chain or other flexible connection 13, which passes around the rear portion of the grooved rim of the wheel and thence extends toward the axle, whereon the ends thereof are secured near the spindles *c*, the chain engaging with idler-pulleys *f* on the frame members 5.

Concentric with the grooved rim of the steering-wheel 12 and upon its upper surface a circular gear-rack *g* is formed or secured, the teeth of which are adapted for a hooked engagement with two foot-levers 14, which are pivoted by like ends of each upon the wheel 12 near its center and extending from their pivot connections *g'* transversely and oppositely, as shown in Figs. 2 and 3.

On the levers 14 at their free ends foot-holds *h* are formed, and straps *h'* or the like are provided (see Fig. 4) for the detachable connection therewith of the feet of the person who rides upon the plow, as will be hereinafter fully explained.

Parallel with and rearward of the frame member 11 a frame member 15 is secured upon the side beams 5 5. Rearwardly of and near the transverse frame member 15 a bracket-block 5ª is formed or secured on the outer side of each side beam 5, these opposite blocks each being vertically perforated for the reception of journals on the upper ends of hanger-arms 16. The hanger-arms 16 are held to swing by means of rock-arms 17, one on the upwardly-projected end of each journal of said arms 16, the arms 17 trending forwardly, as shown in Fig. 2. Upon the lower ends of the hanger-arms 16 two similar disks 18 are mounted loosely and may be provided with ball-bearings. (Not shown.) Said disks having a plano-convex form in cross-section are disposed with their flat faces innermost and adjacent to each other.

As shown in Fig. 3, the hanger-arms 16 have a like curvature inwardly, so that the pair of disks 18 are similarly inclined outward at their upper edges, and it will be evident that by an adjustment of the rock-arms 17 at their free ends toward or from each other the forward edges of the disks will be correspondingly adjusted, and of course when the front edges of the disks are spread apart their rear edges will approach each other.

Upon the transverse frame-bar 15 near its center of length an arched rack 19 is secured, which is disposed horizontally and rearwardly. Pivoted near one end of the transverse frame member 15 is a disk-controlling lever 20, which projects rearward and over the teeth of the arched rack 19, with which said lever may engage.

At one side of the pivot $i$, which connects the lever 20 with the frame member 15, one end of a link-rod 21 is pivoted, as at $i'$, and upon the end of the lever 20 opposite and near the pivot $i'$ the corresponding end of a similar link-rod 22 is pivoted at $i^2$, the remaining ends of the link-rods, which trend outward and oppositely, having their outer ends pivoted upon the forward ends of the rock-arms 17. It will be noted that if the lever 20 is swung toward the right-hand side beam 5, as shown in Fig. 2, the forward edges of the disks 18 will be moved toward each other and when the lever is adjusted toward the left-hand side beam 5 the rear edges of the disks will be correspondingly adjusted, while the forward edges thereof are spread apart, the closure of the rear edges of said disks being indicated by dotted lines in Fig. 3.

Upon a transverse frame-bar 23 at a suitable distance rearward of the bracket-blocks $5^a$ one end of an arched detent-rack 24 is secured and thence curves upward and rearward, and from the rear end of said rack extends an arm which is secured upon a transverse frame-bar 25, whereon the resilient seat-supporting arm 26 is secured by one end, and thence curves upward and forward, having a seat 27 secured upon the upper end of the same, as is shown clearly in Fig. 1.

In bracket-boxes $m$, secured on the upper face of the frame members 5, are journaled the trunnions $m'$, which project outward from blocks or like enlargements $m^2$, formed or secured on like leg members 28, that at their lower ends are secured upon a rear axle 29, on the outer ends of which are journaled the rear ground-wheels 30, said wheels, that are of less diameter than that of the wheels 9, being located below and near the side beams 5 when the plow-frame is substantially horizontal.

The legs 28 are bent inward and upward or toward each other and at their upper ends lap upon opposite sides of an adjusting-lever $28^a$, that projects upward therefrom and carries a detent-pawl $n$, controlled by a rod $n'$ on the lever and having a rocking grip-piece $n^2$ on the upper end thereof. The pawl $n$ meshes between the teeth of the arched rack 24 and serves to hold the legs 28 inclined more or less in accord with the inclined adjustment of the adjusting-lever $28^a$.

It will be seen that the lever $28^a$ is forward of and within reach of a driver seated upon the seat 27, and when said lever is drawn rearward at the upper end the legs 28 will be rocked forwardly at their lower ends, so as to dispose them nearer an upright position, which will draw the wheels 30 nearer to the disks 18 and raise the frame and said disks from the soil in which said disks were embedded, this elevating of the disks and frame being indicated by dotted lines in Fig. 1.

The forward end of the draft-beam 7 is furnished with a clevis $7^a$ for a harnessed connection of a team of draft-animals therewith, and the rear end portion of the plow-frame is of sufficient length to afford weight thereto, which will prevent the plow from being jolted when passing over ruts or small obstructions while in service. In use the driver of the team occupies the seat 27 and engages his feet with the footholds $h$ on the foot-levers 14, the straps $h'$ affording means for such an engagement with the insteps of the feet as will permit an upward rocking movement and subsequent depression of the foot-levers one after the other, and thus enable the proper rotatable movement of the steering-wheel 12. Assuming that draft-animals are connected with the plow and the machine is started at the end of a row of beets that are to be excavated from the soil, the forward movement of the plow will embed the disks 18 in the soil one at each side of the row of vegetables. The operator having previously adjusted the lever 20 leftward, so as to converge the rear edges of the disks 18, the progressive movement of the latter will cause them to both rotate in the direction of the curved arrow in Fig. 1.

The disks by their progressive and rotary motion are together adapted to serve as scoops, that raise the beets to the surface of the soil and do not injure them in any manner, and as the disks are rotated by friction of the soil and have a shear-cutting action thereon the resistance of progressive movement is not excessive. The sharpened edges of the disks 18 and their shear-cutting action adapt them to cut off vines and weeds as the machine moves forward.

In guiding the plow the driver holds the steering-wheel 12 from movement with one lever 14 and retracts the other lever at the side from which the machine is to be turned, an engagement of said lever with the circular rack $g$ and the forward pushing movement thereof pulling the chain 13 in the direction of the arrow $x$ in Fig. 2, which will draw upon the left-hand end of the axle and effect a turning movement of the machine, and a corresponding movement of the other lever will turn the axle oppositely. When the plow is directed straight to traverse a row of beets for their excavation, it may be prevented from deviating from a straight line by an engagement of both levers 14 with the circular rack $g$ at opposite points and by foot-pressure thereon, and it will be seen that the driver by foot movement can perfectly control the progressive movement forward or lateral that is to be given to the plow while the draft-animals are traveling forward. After the plow has been drawn to the end of a row of the beets and excavated them the machine may be turned to engage an adjoining row by drawing the upper end of the lever 28ª to rock it rearward, having first disengaged the pawl $n$ from the rack 24. This movement of the adjusting-lever 28ª rearwardly will rock the legs 28 and wheels 30 toward the excavating-disks 18 and elevate the disks from the ground, as shown by dotted lines in Fig. 1, which will permit the frame on its contracted wheel-base to be turned in a small curve in either direction, thus enabling the driver to start the plow at the end of the row of plants to be lifted, whereupon the disks 18 may be lowered to enter the soil by a forward adjustment of the lever 28ª, as shown by full lines in Fig. 1.

As the disks 18 converge in service at their lower edges and also rearwardly, while said edges are diverged forwardly, it will be seen that the forward movement of the embedded disks will rotate the disks rearward and upward by their engagement with the ground, which will give them a shear-cutting as well as a lifting action on the same, loosening it thoroughly from the beets, that travel up an incline from the bottom of the furrow to the top at the rear of the disks, leaving the soil mellow and without clods, thus permitting the beets to be gathered manually in a clean condition.

The provision of means for lifting the disks 18 from the soil is also advantageous in the transfer of the plow to and from the field wherein it is used, as they may be sufficiently elevated to prevent contact with the road-bed or stones thereon, which would dull the cutting edges of the disks. It will be evident that the improved plow may be employed for the excavation of potatoes, turnips, or parsnips, if desired, and operate very effectively.

Minor changes in constructive details may be adopted within the scope of the claims.

Having thus described my invention, I claim as new and desire to secure by Letters Patent—

1. The combination with a frame having spaced side beams, of depending arms curved toward each other at their lower ends and held to rock on said side beams, a dished excavator-disk pivoted on the lower end of each arm, a rock-arm on the upper end of each curved depending arm, a link-rod pivoted on the end of each rock-arm by one end thereof, a horizontal lever pivoted on the frame, the remaining ends of the link-rods being pivoted on said lever at each side of its pivot connection with the frame, and means for adjusting the horizontal lever for rocking the excavator-disks.

2. The combination with a frame having spaced side beams, and wheels supporting said frame, of arms held to rock on the side beams opposite each other, said arms curving toward each other, below the frame, concaved excavator-disks centrally pivoted on the lower ends of said bent arms and thus inclined toward each other at their lower ends, rock-arms secured on the upper ends of the depending arms above the side beams and projecting toward each other, a lever pivoted horizontally on a transverse member of the frame and extended rearwardly, link-rods pivoted by one end of each on an end of a respective rock-arm, the remaining ends of said link-rods being pivoted upon the horizontal lever near its pivot connection with the frame member, and a supported arched rack, whereon the lever is adjustably held.

In testimony whereof I have signed my name to this specification in the presence of two subscribing witnesses.

EDWARD G. SMART.

Witnesses:
W. E. NORRIS,
JESSE B. IVERSON.